May 5, 1970 J. D. CENTANNI 3,510,576

DATA SAMPLER CIRCUIT FOR DETERMINING INFORMATION RUN LENGTHS

Filed Oct. 3, 1966 9 Sheets-Sheet 1

INVENTOR.
JAMES D. CENTANNI

BY Anthony D. Cennamo

ATTORNEYS

INVENTOR.
JAMES D. CENTANNI
BY
[signature]
ATTORNEYS

INVENTOR.
JAMES D. CENTANNI
BY Anthony D. Cennamo
ATTORNEYS

DATA SAMPLER CIRCUIT FOR DETERMINING INFORMATION RUN LENGTHS

Filed Oct. 3, 1966

9 Sheets-Sheet 4

INVENTOR.
JAMES D. CENTANNI
BY
Anthony D. Cennamo
ATTORNEYS

INVENTOR.
JAMES D. CENTANNI

BY Anthony D. Cennamo

ATTORNEYS

INVENTOR.
JAMES D. CENTANNI
BY Antony D. Cennamo
ATTORNEYS

FIG. 8

WHITE

| RUN LENGTH | CODE |
|---|---|
| 1 | 0100 |
| 2 | 000 |
| 3 | 1100 |
| 4 | 00010 |
| 5 | 10010 |
| 6 | 01010 |
| 7 | 011010 |
| 8 | 111010 |
| 9 | 000110 |
| 10 | 100110 |
| 11 | 010110 |
| 12 | 110110 |
| 13 | 001110 |
| 14 | 101110 |
| 15 | 011110 |
| 16 | 111110 |
| 17 | 0000001 |
| ⋮ | ⋮ (BINARY PROGRESSION) |
| 48 | 1111101 |
| 49 | 000000011 |
| ⋮ | ⋮ |
| 112 | 111111011 |
| 113 | 00000000111 |
| ⋮ | ⋮ |
| 240 | 11111110111 |
| 241 | 0000000001111 |
| ⋮ | ⋮ |
| 496 | 1111111101111 |
| 497 | 000000000011111 |
| ⋮ | ⋮ |
| 1008 | 111111111011111 |
| 1009 | 0000000000111111 |
| ⋮ | |
| 2032 | 1111111111111111 |

BLACK

| RUN LENGTH | CODE |
|---|---|
| 1 | 10 |
| 2 | 1 |
| 3 | 100 |
| 4 | 1000 |
| 5 | 10000 |
| ⋮ | ⋮ |
| N | 1 (N-1) 0's |

INVENTOR.
JAMES D. CENTANNI

BY [signature]
ATTORNEYS

| LINE | RUN LENGTH | CODE ABCDEFGHIJ | FORMAT STEP |
|---|---|---|---|
| 1 | | 000 | |
| 2 | | ~~100~~→ | |
| 3 | 1 | 0100 | W1 |
| 4 | 3 | 1100 | |
| 5 | | ~~0010~~→ | |
| 6 | 4 | 00010 | |
| 7 | 5 | 10010 | |
| 8 | 6 | 01010 | |
| 9 | | ~~11010~~→ | |
| 10 | 7 | 011010 | |
| 11 | 8 | 111010 | |
| 12 | 9 | 000110 | |
| 13 | 10 | 100110 | W2 |
| 14 | 11 | 010110 | |
| 15 | 12 | 110110 | |
| 16 | 13 | 001110 | |
| 17 | 14 | 101110 | |
| 18 | 15 | 011110 | |
| 19 | 16 | 111110 | |
| 20 | | ~~000001~~→ | |
| 21 | 17 | 0000001 | |
| 22 | ⋮ | ⋮ | |
| 23 | | (BINARY PROGRESSION) | W3 |
| 24 | 48 | 1111101 | |
| 25 | | ~~0000011~~→ | |
| 26 | | ~~00000011~~→ | |
| 27 | 49 | 000000011 | |
| 28 | ⋮ | ⋮ | |
| 29 | | | W4 |
| 30 | 112 | 111111011 | |
| 31 | | ~~000000111~~→ | |
| 32 | | ~~0000000111~~→ | |
| 33 | 113 | 00000000111 | |
| 34 | ⋮ | ⋮ | W5 |
| 35 | | | |
| 36 | 240 | 11111110111 | |
| 37 | | ~~00000001111~~→ | |
| 38 | | ~~000000001111~~→ | |
| 39 | 241 | 0000000001111 | |
| 40 | ⋮ | ⋮ | W6 |
| 41 | | | |
| 42 | 496 | 1111111101111 | |
| 43 | | ~~0000000011111~~→ | |
| 44 | | ~~00000000011111~~→ | |
| 45 | 497 | 000000000011111 | |
| 46 | ⋮ | ⋮ | W7 |
| 47 | | | |
| 48 | 1008 | 111111111011111 | |
| 49 | | ~~000000000111111~~→ | |
| 50 | 1009 | 0000000000111111 | |
| 51 | ⋮ | ⋮ | W8 |
| 52 | | | |
| 53 | 2032 | 1111111111111111 | |

FIG. 9

INVENTOR.
JAMES D. CENTANNI
BY Anthony D. Cennamo
ATTORNEYS

INVENTOR.
JAMES D. CENTANNI
BY Anthony D. Cennamo
ATTORNEYS

United States Patent Office 3,510,576
Patented May 5, 1970

3,510,576
DATA SAMPLER CIRCUIT FOR DETERMINING INFORMATION RUN LENGTHS

James D. Centanni, Rochester, N.Y., assignor to Xerox Corporation, Rochester, N.Y., a corporation of New York Filed Oct. 3, 1966, Ser. No. 583,632
Int. Cl. H04n 5/38, 5/44
U.S. Cl. 178—6 4 Claims

ABSTRACT OF THE DISCLOSURE

In a binary encoder for encoding information run lengths in accordance with the statistical probability of occurrence thereof, a video sampler circuit for determining the color of a run, the length of a run, and the end of one run and the start of the next run. The sampler circuit comprises four flip-flops in a shift register array. The first flip-flop monitors the polarity of the input binary information; the second flip-flop monitors the polarity of the next immediate bit of binary information; the third flip-flop monitors the polarity of the present bit of binary information; and the fourth flip-flop monitors the polarity of the previous bit of binary information. Gating circuitry selectively coupled to the shift register monitors the input sequences in order to determine the statistical probability of occurrence of data in the incoming waveform.

This invention relates to graphic communication systems and, more particularly, to the reduction of the bandwidth required for the transmission of binary information signals.

As is known in a normal facsimile system, a document to be transmitted is scanned at a transmitting station to convert information on the document into a series of elecrical signals. These video signals, or carrier modulated signals corresponding thereto, are then coupled to the input of a communication link interconnecting the transmitter with the receiver. At a receiving station, the video signals, in conjunction with suitable synchronizing signals, selectively control the actuation of appropriate marking means to generate a facsimile of the document transmitted.

A principal application of facsimile equipment is the transmission of printed or typewritten documents and letters. It is a distinguishing characteristic of such original documents that printing or typing is arranged in substantially horizontal lines. Examination of a typical letter, for example, will show that lines of typing actually occupy considerably less than half the vertical dimension of the letter, the rest of its dimension being blank and corresponding to spaces between lines as well as blank spaces at the top and bottom of the letter. In a conventional facsimile system, all parts of such a letter are normally scanned at a uniform rate. Assuming transmission over an ordinary telephone line, it may take in the order of six to fifteen minutes to transmit an ordinary letter with reasonable resolution. Considering the cost of the telephone service, such a long transmission time becomes a serious limitation on the economic usefulness of facsimile equipment.

In addition, it is often desirable that the output binary information from an electronic computer or other digital output device be transmitted to one or more of a number of remote locations for output printing, or for permanent or temporary storage and subsequent readout. A transmission network similar to that used in a facsimile system would then be necessary for the transfer of information from the computer or the like to such a remote printer.

The signal redundancy inherent in computer or facsimile output waveforms, due, for example, to the fact that the waveform comprises two-level binary information and the attendant long periods of little or no information transmission, have led to the development of various encoding techniques to reduce such redundancy, thereby eliminating the wasted transmission line. One such encoding technique is known as run length encoding in which binary numbers corresponding to various blocks of binary data are transmitted rather than the usual binary signals. In such a system, a binary number of relatively few bits may be sent in lieu of a larger block of video data.

Such encoding techniques, while significantly reducing the number of binary digits or bits which must be sent and thereby reducing the transmission time, have not been entirely satisfactory. In a normal facsimile system, for example, the information is, in general, not uniformly spread over the document surface; thus, the rate at which the scanner presents information to the transmission channel varies with time and sometimes a complete scan line may consist of a single information bit, black or white, while the rest of the line is the other level. In a computer system, long periods of redundant information may be transmitted between information words which would not fully lend itself to prior art encoding techniques. For this reason, conventional binary transmisison systems with known encoding techniques do not fully utilize the capacities of the transmission channels, and thus the cost thereof remains prohibitively high.

It is accordingly, an object of the present invention to provide apparatus for sampling data information in a run length encoder utilizing the statistical distribution of information on a document.

It is another object of the present invention to optimize the sampling of the data information in graphic communication systems.

In accomplishing the above and other desired aspects, applicant has invented novel methods and apparatus for reducing the redundant information in transmitted digital waveforms. There is disclosed a novel selective encoding technique utilizing a typical distribution of information on a document to statistically encode the detected lengths of redundant background information into short code word representations. A more frequently occurring run length will be encoded with a shorter code word than that of a lesser occurring run length.

In the encoding process, successive video information bits are inspected in sequence and the run lengths detected and monitored. A format generator, in response to the changing run lengths presented to it, generates the necessary format levels to allow for the different code word lengths which represent the different detected run lengths. An output shift-register/counter is provided to receive and generate the encoded words. A shift/count control unit, in response to the format generated by the format generator, the present code in the shift-register/counter and the detected binary levels in the video sampling unit, generates the shift level and shift enable signals to provide the necessary signal levels within the storage units in the shift-register/counter.

In accordance with the different aspects of the present invention, the black and white representative information may be variously encoded. In one aspect of the invention, the white, i.e., background redundant information may be encoded according to the probability of occurrence thereof, while the black, i.e., data information may be encoded according to a separate probability function, the probability density function of the black information only. A second aspect of the invention would include the encoding of the black and white information according to the same statistical probability density function of the combined black and white signals. As a third aspect of the present invention, the white representative information may be encoded according to the probability of occurrence thereof; while the black representative information would not be converted into a shortened code word but transmitted on a bit-by-bit basis to the receiving unit. Photographic negatives may be efficiently encoded by inverting the video signal and encoding the video in accordance with any one of the three methods set forth above.

For a more complete understanding of the invention, as well as other objects and further features thereof, reference may be had to the following detailed description in conjunction with the drawings wherein:

FIG. 8 is a representative tabulation of the code words useful in understanding the various aspects of the present invention;

FIG. 9 is a representative tabulation of the progression of the code words and associated formats.

Figure 1:
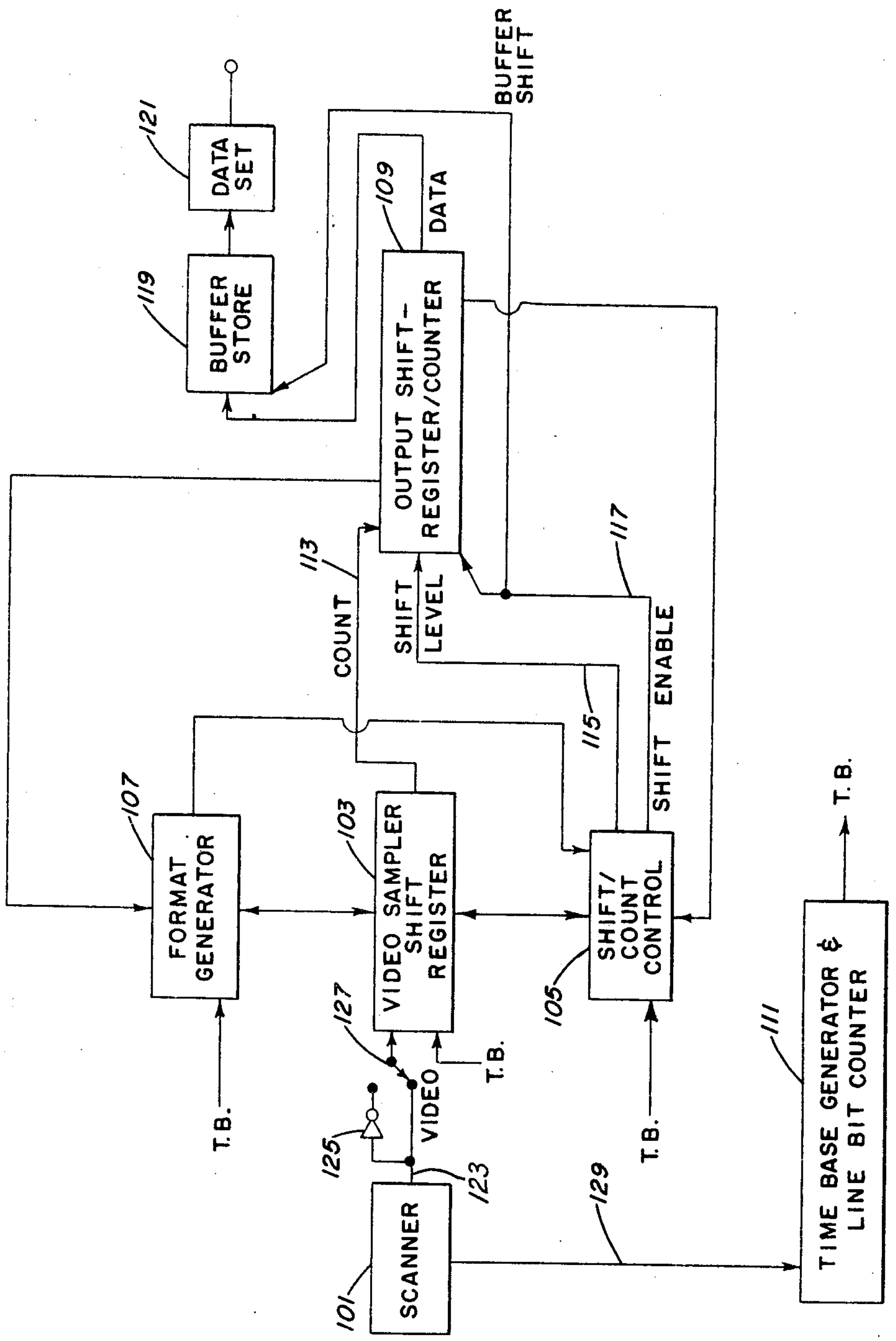
FIG. 1 is a block diagram of the transmitter portion of a data transmission system employing the principles of the present invention.

In accordance with the principles of the present invention, consecutive bits of the same logic level are converted into a code word. Each group of consecutive bits of the same level is termed a run, whose length is represented by a number of consecutive bits. An article by C. E. Shannon entitled "A Mathematical Theory of Communication," printed in July 1948 in the Bell System Technical Journal, vol. 27, pages 379 and 623, disclosed that it is possible to transmit a shorter code for a more frequently occurring message than that for a less frequent message. The encoding technique of the present invention makes use of the fact that different run lengths have different probabilities of occurrence in facsimile messages, and uses this fact to achieve a reduction in the total number of bits in the encoded message over the original message. It is particularly suited to documents containing typewritten information, but will effect compression on almost all types of business documents, maps and drawings. The reduction in bits results in a reduction in the time-bandwidth product, which may bring about a savings in the transmission time of the facsimile message, a reduction in the bandwidth required to transmit the message, or a combination of the two.

The probability of the various run lengths can be used to generate a code word for each run length so that the encoded message contains less bits than the original message. The encoding procedure could be performed on both black and whilte run lengths of either of them. That is, the run length code as set forth according to the principles of the present invention may be utilized in coding both black, i.e., information, and white, i.e., redundant background, information, or just white information with a separate code for the black information. Such different codes may be due to the fact that the same run lengths of black and white may have different probabilities of occurrence. The probabilities would be ranked in descending order and the length of the code is found for each run length according to the procedure set forth by D. A. Huffman, "A Method for the Construction of Minimum Redundancy Codes," Proceedings of the IRE, vol. 40, page 1098, September 1952. The particular code sequence is not of interest; only that of the length of the code as determined by Huffman. The run lengths are then listed in ascending order with the length of their respective code words and probabilities.

If the documents to be encoded primarily contain typewritten information, then a plot of the probability-density function of the black run lengths will peak at approximately two or three bit run lengths, and will approach zero as the length of the runs increases. White run lengths will peak at approximately three or four bit run lengths, and will approach zero as the length of the run increases, except for the longest run length, which represents an all white line, whose probability will be very high. The point at which the peaks occur is determined by the type style, spacing, and the scanning resolution used. Any information waveform exhibiting a similar probability-density function wherein short lengths are most probable and the probability of longer run lengths approaches zero as the run length increases can be encoded by the technique hereinafter more fully described, and will result in a reduction in the number of bits in the encoded data as compared to the original data.

The all white line presents a special problem because it usually takes longer to scan a line and determine that it is all white than it does to transmit the code for the line. The difference between the time to scan the line and the time to transmit the coded information therefor is unusable or dead time. Systems which do not prescan lines or make use of this dead time should not include this high probability in the list of probabilities when determining the Huffman code. Nothing is gained by assigning a short code word to the all white line if the transmission time for this code word is less than the time to scan the line. Therefore, the probability of existence of an all white line is changed so that it is the least probable event, that is, encoded with the longest code word of the encoding sequence. Under these circumstances, the sum of the probabilities of all terms used in determining the length of the code word assigned to each run length will not be unity. However, the Huffman technique will still be valid.

Referring now to FIG. 1, there is shown a block diagram of a facsimile transmitter utilizing the principles of the present invention. The transmitter portion of the system includes a facsimile scanning device 101 which, in a normal manner, derives individual pulses corresponding to black and white picture elements or dots forming the pictorial material explored by the scanner. The scanner may be any of the mechanical or electronic devices well known in the art for translating the densities of elemental areas of typed or pictorial copy into signal waveforms. The scanner may conveniently include a light source, such as a cathode ray tube or rotating turret scanner, an optical system which delineates elemental areas of the subject copy, means for systematically moving one with respect to the other in two directions, and a light-sensitive detection device together with the requisite associated circuits. Included in the scanner are the normal facsimile circuits such as deflection, synchronizing, and timequantizing circuits, which convert the analog information signals to a digital output waveform.

The output digital waveform on the lead 123 from scanner 101 is directed to the video sampler shift register 103. This signal may be inverted for negative copies with switch 127 and inverter 125. The time base generator 111 generates the necessary timing signals for system operation as seen in the accompanying drawings. The associated line bit counter, which could comprise a logical network or flip-flop circuits, is used to monitor the number of digits scanned as the scan beam is directed across a document. The scanner 101 also generates a signal on lead 129 which synchronizes the line bit counter so that each step of the counter corresponds to a particular bit of video of any line.

The binary video information from the scanner or information source 101 is shifted through the video sampler 103 and the binary level of each succeeding digit being shifted therethrough is monitored at the separate flip-flop circuits comprising the shift-register by the former generator 107 and the shift/count control 105. Inasmuch as the different run lengths of the black and white information will be encoded with different code words which may assume several different lengths according to the probability density function of the run lengths of the white or black information, the information from the video sampler 103 is directed to the shift/count control 105 and the format generator 107 to control the shifting and counting in the outputshift-register/counter 109.

The format generator 107 is constructed in accordance with the code chosen, which in turn is based on the probability density function of the information to be encoded. As the video sampler 103 detects the video level, it will direct the shift/count control 105, which in turn will instruct the shift-register/counter 109 to count. The shift/count control 105 will continually sample various stages of the shift-register/counter 109 in accordance with the particular step the format generator 107 is on, and will shift the shift-register/counter 109 at the appropriate time and increase the length of the code word. In addition, the format generator 107 will also sample various stages of the shift-register/counter 109 and will advance to the next format step when predetermined codes are reached. Each step of the format generator 107 will instruct the shift/count control 105 to detect different codes at the output of the various stages of the shift-register/counter 109 and these codes will then be used to instruct the register 109 to shift. Thus, for example, as a long white run length passes through the video sampler 103, the shift/count control 105 will detect this condition and a count pulse on line 113 will direct the output shift-register/counter 109 to commence counting the length of the run under consideration.

As the white information is shifted through the video sampler 103 and as the run gets longer, the probability of occurrence of the longer run length decreases with each incoming additional bit to the run. The format generator 107, monitoring the state of the shift-register/counter 109 in accordance with the level of the information being shifted through the video sampler 103, emits signals in the form of format steps of the shift control 105. The shift control 105 emits a signal on line 117 in accordance with each format step of the format generator 107 to the shift-register/counter 109 to shift in the signal level on line 115. Each time a bit is shifted into the shift-register/counter 109, the length of the code word increases by one bit. Thus the encoded word itself becomes longer in accordance with the increasing length of the input turn. As the run length of the input information becomes longer, the counting and shifting operations continue until the end of the run is detected.

The shift enable signal on line 117 is also directed to the buffer storage unit 119, which is coupled to the output of the shift-register/counter 109. Such information is stored temporarily at the buffer store 119 before transmission to the receiver station. The buffer store may comprise a logical flip-flop circuit arrangement or a magnetic core matrix, for example. The encoded waveform is received from the output shift-register/counter 109 by the buffer store 119 as information is shifted into the shift-register/counter 109. However, the information to be transmitted over the transmission medium is drawn from the buffer store 119 at a rate which will approach the maximum rate compatible with the bandwidth capability of the medium itself. The buffer store 119 may be of sufficient capacity to receive all encoded information as it is generated. The scanning operation, therefore, would continue uninterrupted as a complex line and its associated coded waveform would still be able to be stored in the buffer 119. It is preferred, however, to provide a buffer store of less capacity, which is therefore less expensive, but can still handle complex lines. In the event the buffer has received a complex line and is therefore not available to handle the next line because the transmission rate is much less than the scan rate, the scanner will continue to scan the next line, but the information will not be encoded until the buffer store has adequate space to store the entire line. The scan would be enabled at the beginning of the scan so as to detect the information on a complete line basis at all times. It is to be understood, however, that a line is normally scanned only once, and the document is advanced, but subsequent scans are ignored until sufficient storage is available.

Figure 2:
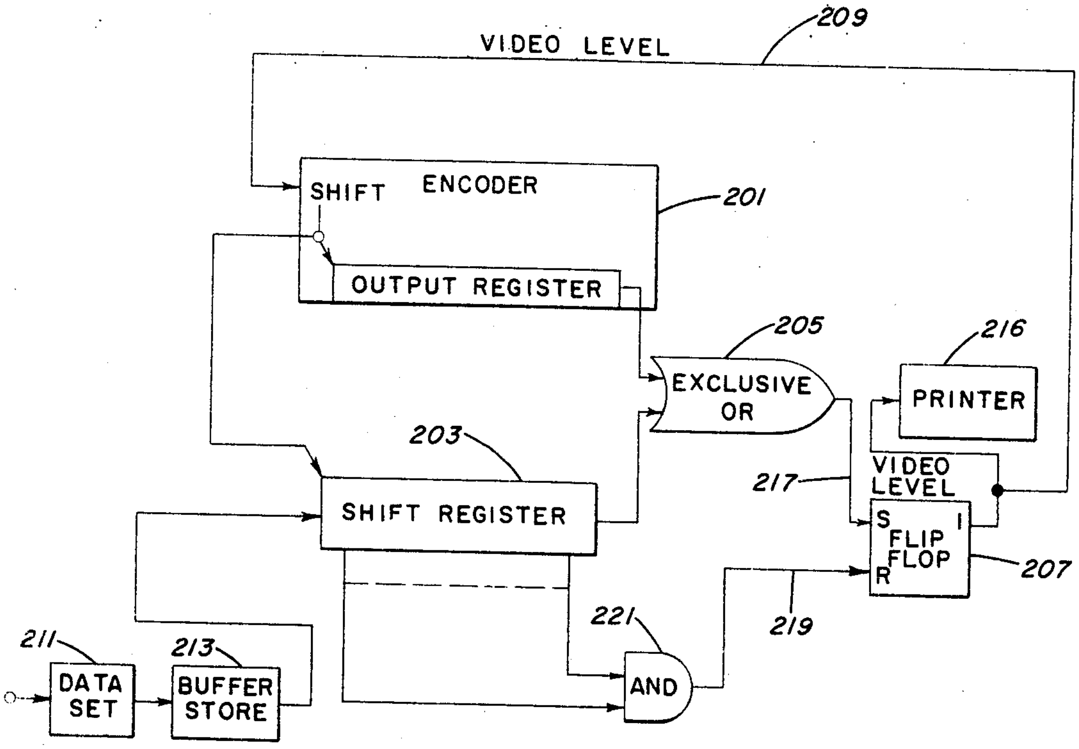
FIG. 2 is a block diagram of the receiver portion of a data transmission system employing the principles of the present invention.

At the input and output ends of the transmission medium are circuits 121 and 211, in FIGS. 1 and 2, respectively, for providing compatibility between the transmitter and receiver circuits and the transmission medium. These circuits, commonly called data sets, provide impedance matching and power amplification and/or modulating apparatus. Such data sets may comprise line drivers or a frequency shift keyer. A clock source of known frequency may also be provided for system synchronization.

The transmitted digital information is received from data set 121 of FIG. 1 over the transmission medium at data set 211 in FIG. 2. The data set transfers the information from the transmission mode to that compatible with operation in the receiver. Input buffer store 213, operationally a mirror image of the output buffer store 119 in FIG. 1, receives the information from the data set 211 and is drawn upon by the decoding circuitry as is necessary for the decoding operation. The binary decoder, as described herein, reconstructs the signal waveform with its associated redundancy.

The decoding apparatus as shown in FIG. 2, comprises an encoder as previously described, with an additional shift register, the outputs of which are compared and sent to the output printer. Thus, the input encoded information as received by the data set 211 and stored in buffer store 213 is shifted into the shift register 203. The encoder unit 201 would, as seen in FIG. 1, comprise the format generator 107, the video sampler shift register 103, the shift/count control 105 and a time base and line bit counter 111, in addition to the output shift-register/counter 109. As the input information from buffer store 213 is received at shift register 203, the shift signal therefor, as provided at the encoder 201 to shift in the encoded information into output register 109, also operates as the shift signal for the incoming information to shift register 203. Thus, as black or white encoded information is shifted into the shift register 203, the encoder 201 will be generating the code words for a run length as was done in FIG. 1 when the information was received from a scanner.

At the start of a run, the shift-register/counter 109 shifts in the appropriate number of bits for a one bit run length and the shift-register 203 also shifts in the same number of bits. The appropriate video level is generated in a flip-flop 207 and its output on line 209, determines the level that the printer 215 will print on the output material. The video level on line 209 also simulates the video on line 123 generated by the scanner 101 in a transmit terminal. The printer 215 will continue to print the output document while the encoder 201 generates the code for successively longer run lengths with each bit period, determined by time base 111. When the shift-register/counter 109 of the encoder 201 shifts, the shift-register 203 also shifts. As each new code word is generated, exclusive-OR gate 205 compares the shift-register/counter 109 with the shift-register 203, bit-for-bit. When the two registers compare, the output of the exclusive-OR gate 205 will complement flip-flop 207 via lead 217. This comparison indicates the end of a run of that level; the now complemented output of flip-flop 207 will instruct the encoder 201 to generate the code for the other video level and direct the printer 215 to print this level.

The encoder 201 always starts a new run with the code for a one bit run of that color. Usually, this will be the shortest code. If the received code word to be decoded is longer in length than that of a one bit run length, only the number of bits contained in the code for a one bit run length will be shifted into shift-register 203 at the start of a run. In the absence of transmission errors, comparison at exclusive-OR gate 205 cannot occur until the encoder 201 has gone through the sequence which includes shifting the shift-register/counter 109 and the shift-register 203 a sufficient number of times to place the entire code word to be decoded into the shift-register 203, and counting the shift-register/counter a sufficient number of times so that the information in the two registers compare bit-for-bit. The code sequence used is of a class of uniquely discernible codes, i.e., a short code word can never be used as the prefix for a longer code word, and thus the encoder 201 will always require the same number of bit periods to generate a code word equivalent to the received code word before comparison occurs in exclusive-OR gate 205 as the transmitter encoder required to generate the code word.

It is necessary to know the level of the first run of each line. Once this is known, successive run lengths must alternate between the two levels, where the second run is the converse of the first, the third run is the converse of the second, etc. Sync information to denote the start of a line must also be generated and transmitted by the transmit encoder. Different sync words may be used to indicate whether the line starts with a white or black run. In FIG. 2, lead 219 and AND gate 221 detect sync and determine the level of the first run of the next line and steer flip-flop 207 via lead 219. An alternate method based upon the fact that most lines of typewritten document start with a white run is to "force" the first bit of each line to the white video level at the transmit scanner, and thus the printer "knows" that each line must start with a white bit, and thus a white run length. With this method, a sync word need not accompany each line.

Coupled to the flip-flop 207 is the output printer 125 as was hereinbefore described. The printer 215 may comprise a flying spot scanner including a cathode ray tube similar to the type that may be employed in a facsimile transmitter as set forth in conjunction with scanner information source 101 in FIG. 1. The electron beam of the cathode ray tube in the printer is selectively gated on in response to the received video signals, thus generating an information modulated source of light rays for selectively illuminating elemental portions of the light-responsive photoreceptor surface of a xerographic printer. For a complete understanding of a xerographic facsimile printer, for example, reference may be had to U.S. Pat. 3,149,201, issued Sept. 15, 1964 to C. L. Huber et al. It is to be understood, however, that the xerographic facsimile printer is exemplary only and other types of printers known in the art may be employed in practicing the present invention.

The time base generator 111 in FIG. 1, generates the timing pulses necessary for operation of the encoding circuitry. Discrete timing pulses which occur between the incoming bit times are necessary because certain operations must happen before the next incoming bit appears so that no information will be lost while the circuits are determining the status and length of the runs of such incoming information.

FIG. 8 discloses the code chosen for encoding the different white run lengths, from a run length of one to the run length of 2032 digits which would comprise an all white line. Since the very short run lengths would occur more often than the longer run lengths, the shorter run lengths are encoded with the shorter codes according to their probability of occurrence. The longer the run length, the less frequent the run length appears, and thus the longer the encoded word representative thereof. For a run length of two digits, the most probable run length, the coded word comprises three digits. For run lengths of one and three digits, the encoded words comprise four digits. For run lengths of four to six, the encoded word comprises five digits. For run lengths of seven to fifteen, the encoded word comprises six binary digits. As the number of digits in the particular run lengths increase, the encoded words representative thereof increase accordingly, as shown in FIG. 8.

As the encoded words lengthen for the respective lengthening run lengths, the prefix of the code words additionally become longer while still retaining the unique code for the section of run length for which the particular length code word is representative therefor. For instance, the code word for a run length of six digits is 01010. The encoded word for a run length of seven digits is one digit longer than the code word representing six binary digits and is seen to be 011010. Thus, while the first four digits of the encoded words for the six and seven bit run lengths are the same, the next digit in the run length code for seven digits, excluding presently the last digit shown, still would not appear as a run length for any of the run lengths below six digits. The last digit on the run length word for a seven bit run length is to allow the counting from there of the longer run lengths.

As previously mentioned, progressively longer run lengths will require progressively longer code words in accordance with the ranking of the probability of the run lengths. In facsimile, progressively longer run lengths usually have progressively smaller probabilities. However, certain resolutions with facsimile or a data input other than facsimile may not exhibit this properly. Therefore, FIG. 8 has been designed to encode a set of data whose most probable run length is two consecutive bits. For this reason, a two bit run length has been given the shortest code word. This has been chosen to demonstrate the flexibility of the encoder and decoder described herein in that they can be adapted to a wide range of data. It is apparent, however, that different documents may leave different statistical ranges of information occurrence.

Figure 10:
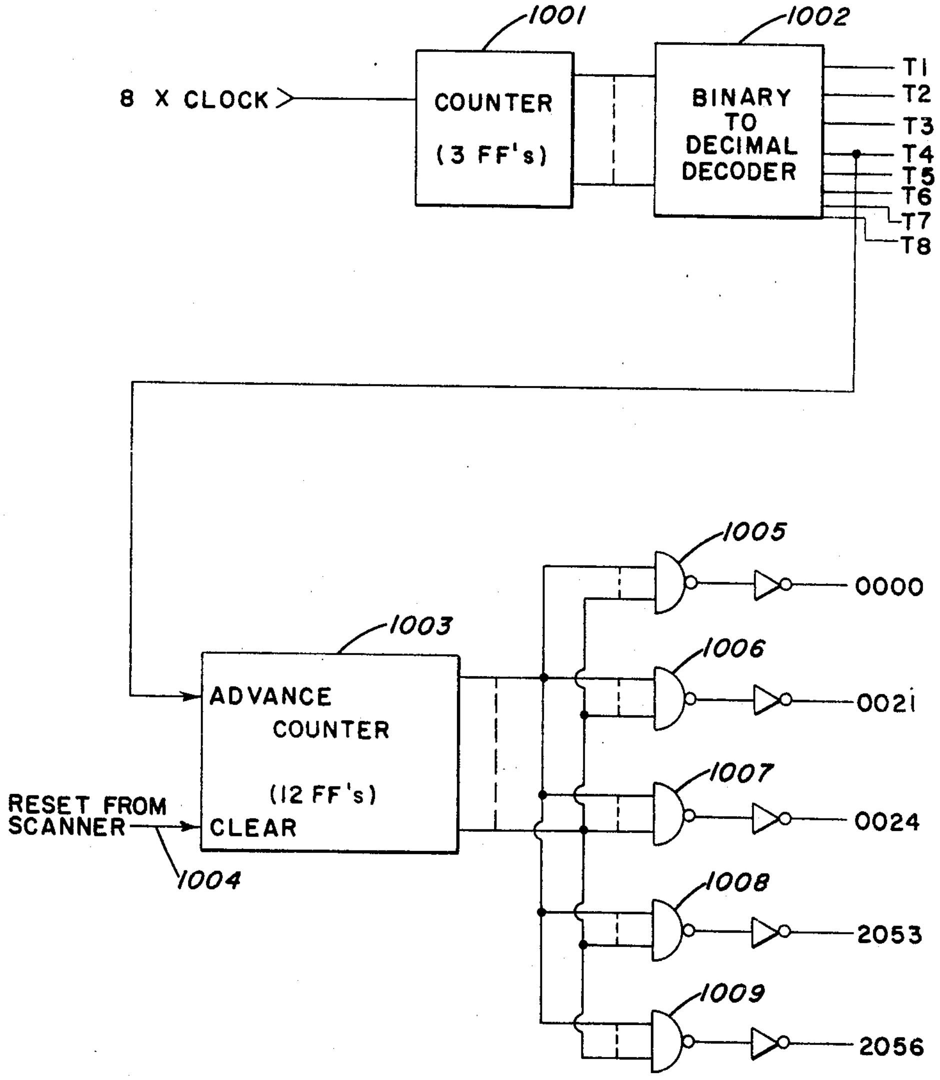
FIG. 10 is a block diagram of the time base generator and line bit counter in the systems of FIG. 1.

The basic timing signals required are produced by the time base generator illustrated in FIG. 10. Since some shifting and control functions must be accomplished within a datum period, a primary clock operating at eight times the data rate is used to divide the data period into eight time intervals. The 8X clock may be derived from the associated data set or a local oscillator. The 8X clock drives a conventional binary, three stage counter, 1001. The outputs of the binary are decoded by a binary to decimal decoder, 1002.

In the system described herein, each line of video information consists of 2032 bits. In addition to these bits, there are 68 bits of dead time which allow for scan retrace in the scanner. The scanner resets the line bit counter 111 via lead 129 of FIG. 1, twenty-one bits before the first bit of a line is scanned. The output of the line bit counter at reset will be called 0000. Hereinafter, four digit numbers will be used to describe the count of the line bit counter which corresponds to the number of bit periods after 0000.

Each of the decoded combinations are labeled to denote their timing sequence beginning with $T_1$, $T_2$, through $T_8$ and is continuously repeated. Signal $T_4$ is used to advance the line bit counter, 1003. The line bit counter, a conventional twelve stage binary counter, is used to determine the start and end of video of each scan line. In operation, a reset signal on lead 1004, is derived from the scanner at the start of each scan interval and is detected by the decoded decimal count 0000 (gate 1005). Each $T_4$ pulse advances the counter by one count. The other counts decoded are: 0021 (gate 1006) which indicates start of video, Count 0024 (gate 1007) for delayed start of video, count 2053 (gate 1008) for end of video, and count 2056 (gate 1009) for delayed end of video. This delay will be apparent after the discussion of the video sampler, hereinafter set forth.

Figure 3:
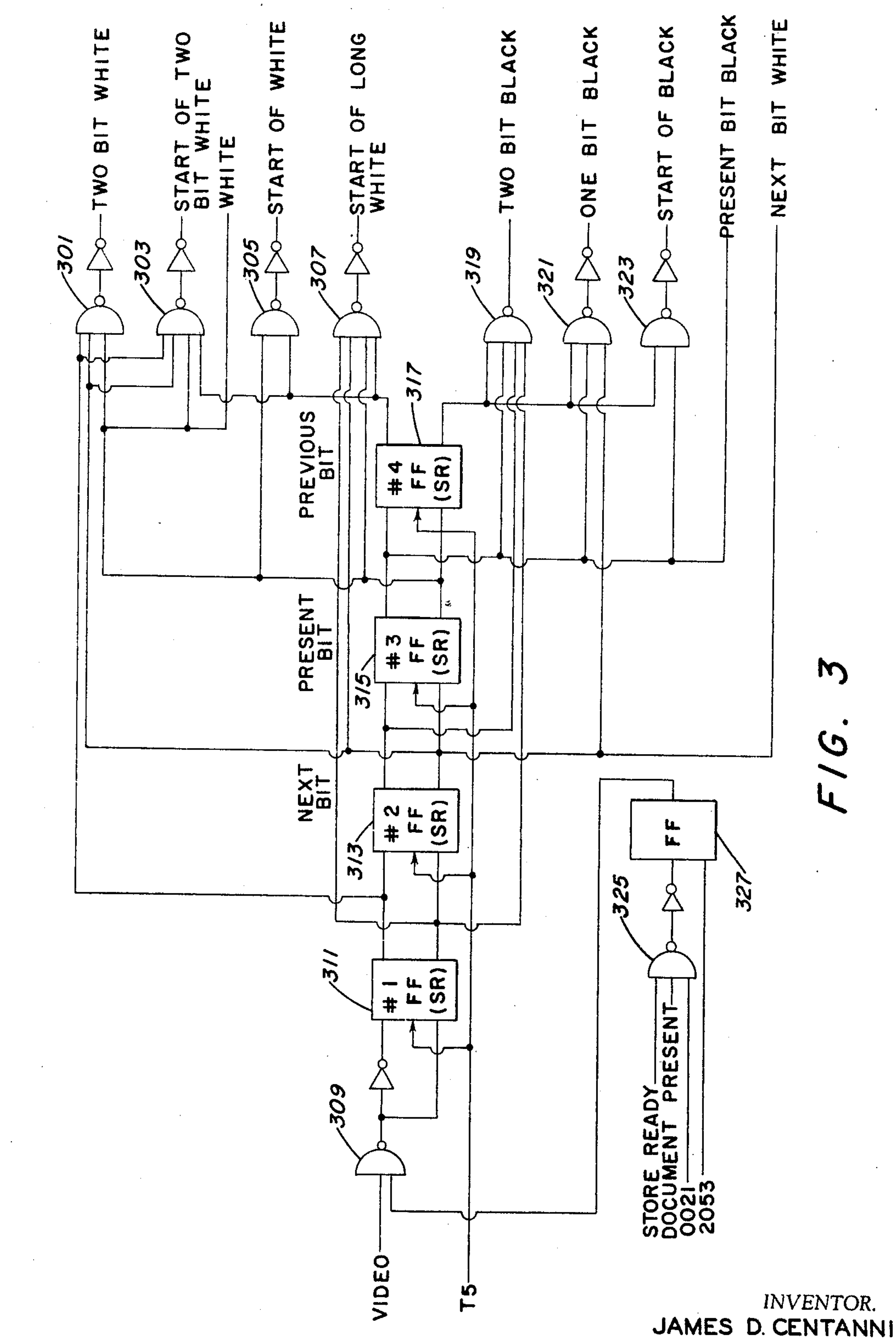
FIG. 3 is a detailed illustration of the video sampling unit in the systems of FIG. 1.

Referring now to FIG. 3, the video sampler receives the video information from the scanner and determines the color, that is, black or white, of the run length being encoded, and a change in the color of run lengths. A line of the document is composed of 2032 bits, and is scanned from 0021 to 2053. Gate 325 senses the presence of a document in the scanner (document present) and the availability of adequate storage (store ready) and sets flip-flop 327 at 0021, the first bit of a line. Flip-flop 327 will continue to have an output until 2053, the last bit of a line. The output of flip-flop 327 gates the video from the scanner at gate 309 into a four stage shift-register composed of flip-flops 311, 313, 315, and 317. A logical "zero" on the input video lead will represent white information and a "one" will represent black. The four stage shift-register makes it possible to detect one and two bit runs before they are encoded. The reason for this feature will become apparent in the discussion of the format generator and the shift control circuits.

Flip-flop 315, the third stage of the four stage shift-register, represents the bit of information being encoded, and is labeled "present bit." The two adjacent stages, flip-flops 313 and 317, are the "next bit" and "previous bit," respectively. This technique will insert a three bit delay in the video stream as the data is clocked through flip-flops 311, 313, and 315. This three bit delay means the first bit of a line of video will not be available for encoding until 0024. Therefore, the format generator and the shift control will not start the encoding process until 0024.

The major functions of the video sampler are to determine the color of a run, the length of a run, and the end of one run and the start of the next run. The start of a white run occurs when the previous bit, stored in flip-flop 317, is black and the present bit, stored in flip-flop 315, is white. The start of "white" signal is detected by gate 305. The start of "two bit white" signal detected by gate 303 is generated by determining that the previous bit was black, the present and next bits are white, and the video two bit periods later is black. Flip-flop 311 contains the information about the video two bit periods later. If the video in the first three stages is white, and the fourth stage, flip-flop 317, is black, then a white run of three or more bits has begun. This is detected in gate 307, whose output is "start of long white."

During that portion of the scan in which video is not being encoded, logical zeros will be shifted through the register. This is equivalent to white video. At the start of a white line, the previous bit will not be black, and thus a "start of white signal" cannot be generated. However, the format generator will sample the shift register during the first bit of video and can determine the type of run. The "white" signal derived from flip-flop 315, will serve this purpose. If the present and next bits are white, and the following bit, flip-flop 311, is black, gate 301 will generate the "two bit white signal." This signal will be sampled only at the start of a line in the format generator.

Gate 323 will generate "start of black" when the previous bit is white and the present bit is black. Similarly, one bit black and two bit black run lengths are detected by observing that the previous bit is white, the present bit is black, and the next bit is white for a one bit run and black for a two bit run. In addition, flip-flop 311 must be white for a two bit run. These two signals are detected in gates 319 and 321. The output of flip-flop 315, "present bit," also generates the "present bit black" signal. The shift control must know when the last bit of a black run is being encoded. Therefore, flip-flop 313, "next bit," is used to generate the "next bit white" signal. The reason for generating these signals will be apparent after the description of the format generator and shift control circuits.

Figure 4:
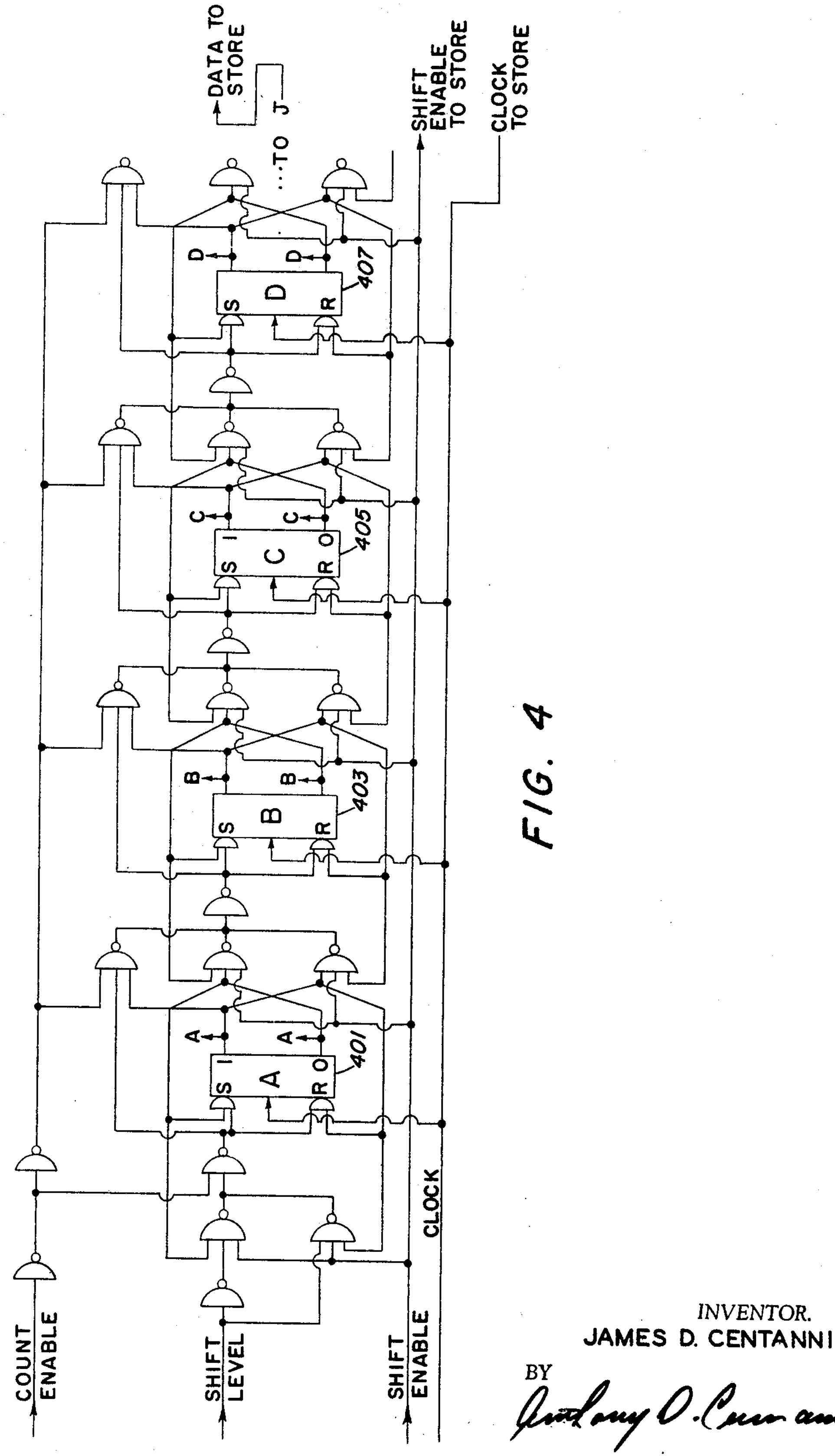
FIG. 4 is a detailed illustration of the shift-register/counter in the system of FIG. 1.

FIG. 4 shows the shift-register/counter 109. A logical "1" on the count enable line allows the entire register to count in a 1–2–4–8 sequence with each clock pulse. A logical "1" on the shift enable line allows the entire register to shift one bit to the right with each clock pulse. The logical level on the shift level line will be shifted into stage A, flip-flop 401. This shift process also loads the buffer store 119; the logic level on stage J is shifted into the store with the same clock under the direction of the shift enable signal. In the absence of both count enable and shift enable signals, the register does not change state. The presence of both signals simultaneously is not logically feasible.

Figure 7:
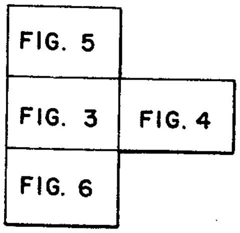
FIG. 7 is a block diagram showing the relationship of FIGS. 3, 4, 5 and 6.

The outputs of stages A through J and the inverse level of stages A, B, C, D and E direct the operation of the format generator and the shift control circuits. The operation of these circuits is explained below in reference to FIGS. 5 to 9. FIG. 7, however, shows the relationship of FIGS. 3 to 6.

Figure 5:
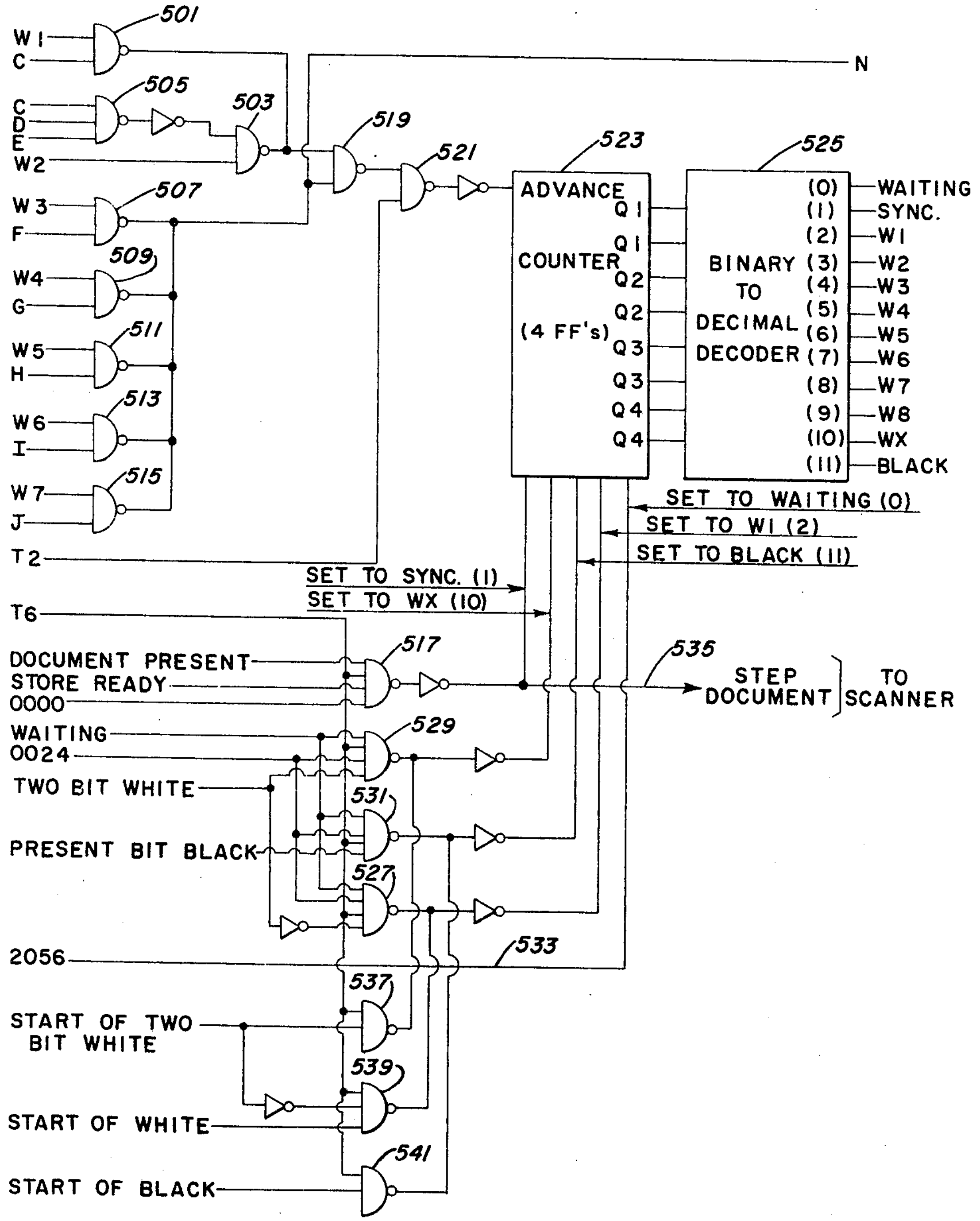
FIG. 5 is a detailed illustration of the format generator in the system of FIG. 1.

In accordance with the discussion of the run length encoded words, as was hereinbefore described in conjunction with FIG. 8, a format generator is provided to condition the circuitry for the control of the length of the encoded binary words. FIG. 5 shows the generation of nine formats from W1 through W8 and WX for the generation of the white encoded words, in addition to the format step for a sync word occurring between the separate scan lines, and a black format step for encoding the black information, which is encoded differently from the white information in the circuit to be described in this embodiment.

As can be seen in reference to FIG. 5, the inputs to gates 501 through 515 include W1 through W7 which are generated by the format generator itself. The other inputs to these gates are the status of the flip-flops in the shift-register/counter 109 of FIG. 4. When any one of these gates is primed, a signal will be developed at the output of gate 519, which when coupled with time base signal $T_2$ at gate 521, will advance counter 523, which is of any known design. The binary outputs of counter 523 are converted to twelve separate outputs by the binary to decimal decoder 525, also of any conventional design. The decimal equivalent of each binary count appears in parentheses in the binary to decimal decoder 525. Gates 517, 527, 529, 531 and lead 533 furnish DC set signals which set the counter to the proper binary count to produce format steps labeled "sync," "WX," "black," and "waiting," respectively.

Count 2056, which occurs three bits after the last bit of a line of video, resets counter 523 to the waiting condition via lead 533. The three bit delay is necessary because the video is delayed three bits in the video sampler circuit as was hereinbefore set forth. The counter 523 will remain on "waiting" until the scanner detects the presence of a document and generates a "document present" signal, and the store generates a "store ready" signal. When these two signals are present, they will prime gate 517 at 0000, which will set counter 523 to sync via line 535. The signal on lead 535 also instructs the scanner to step ("step document") to the next line after it completes scanning the present line. The sync signal will direct the shift control to generate the sync word. This operation will hereinafter be described in conjunction with the shift control circuitry, FIG. 6. At the completion of the sync word, the entire line will be encoded. At the end of the line, when bit 2056 occurs, the counter 523 is again reset to the waiting condition via lead 533. When bit 0000 occurs, gate 517 will determine that the document is still present and has not been completed, and that the store has adequate space to store the next line. If these conditions exist, the counter 523 will then be set to sync and the step document signal will be generated on lead 535. However if the store is not ready, the counter 523 will remain on the waiting step until a store ready signal is received, and will then be set to sync when 0000 occurs. At the end of the document, the document present signal will disappear and will thus inhibit gate 517 and the counter 523 will remain on the "waiting" step until another document is presented to the scanner.

When the counter 523 is on the sync step and the line bit counter reaches count 0024, this count and sync will prime gates 527, 529, and 531. The third lead of one of these gates will be primed by one of the following three signals from the video sampler; gate 527 will be primed if the video is white run other than two bits long, gate 529 will be primed if the video is a two bit white run, and gate 531 will be primed if the video is a black run. The outputs of gates 527, 529, and 531 will set the counter 523 to W1, WX, or black, respectively. These format steps, in turn, direct the operation of the shift control circuit.

FIG. 9 shows the codes for white run lengths, other than a two bit run length, as they are generated in the shift-register/counter. Those data with an arrow through them are not actually part of the code, but are only intermediate steps that the shift-register/counter passes through in arriving at the code. Those data with an arrow through them will be shifted one bit to the right by the shift/count control circuit which will hereinafter be explained in conjunction with FIG. 6. The code generated after the shift operation appears on the next line. The data appearing on lines 5, 20, 25, 31, 37, 43, and 49 fulfill the input requirements to gates 501, 505, 507, 509, 511, 513, and 515, respectively, in FIG. 5, and thus counter 523 will advance one step when each of these datum appear at the respective outputs of shift-register/counter.

Gates 537, 539 and 541 in FIG. 5 detect the end of a run length and the start of a run length of opposite color. Gate 537 detects the start of a two bit white run and sets counter 523 to WX. Gate 539 detects the start of a white run other than two bits and sets counter 523 to W1. Gate 541 detects the start of a black run and sets counter 523 to black. All format steps direct the operation of the shift/count control circuit which is explained below.

Figure 6:
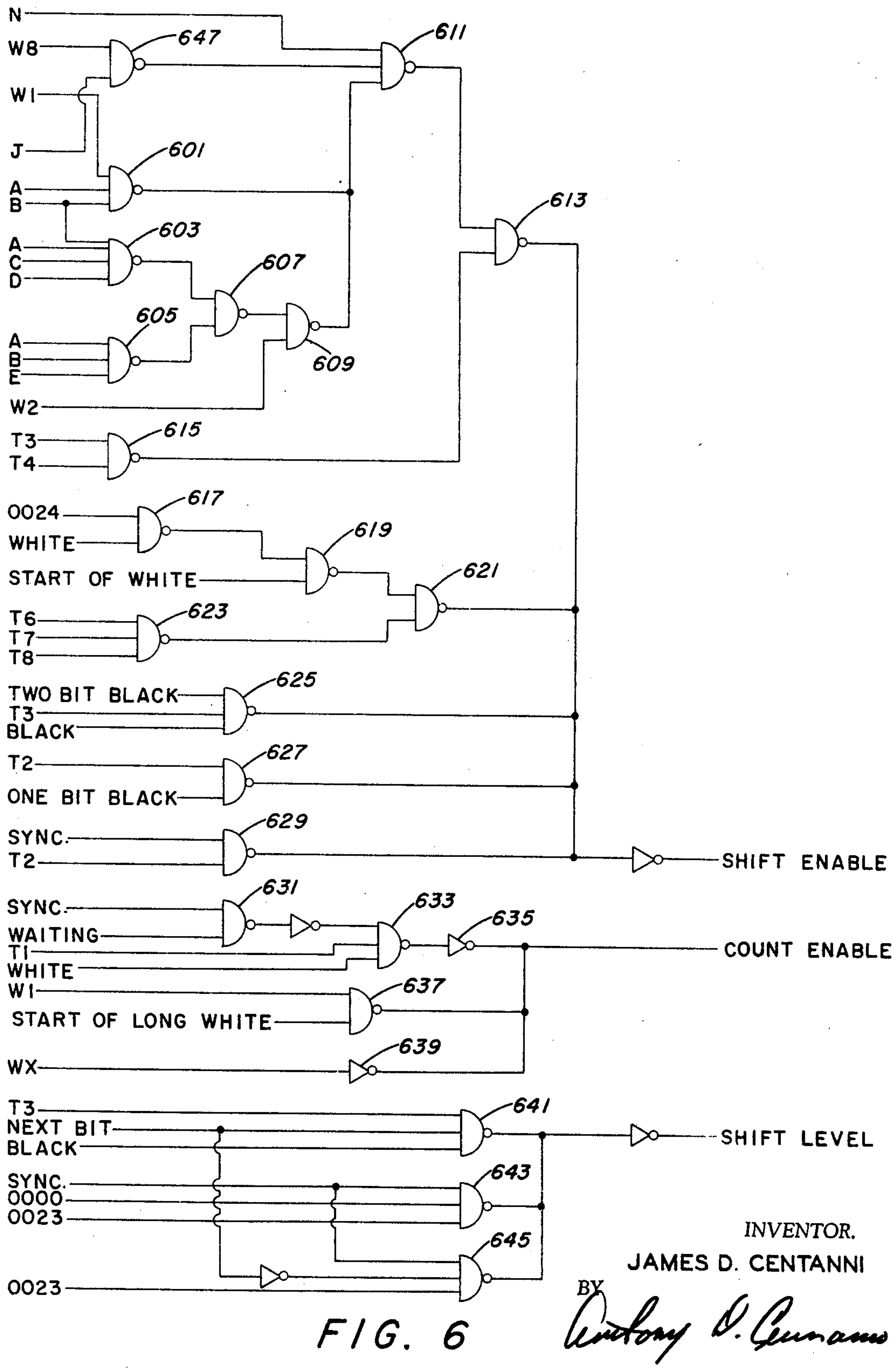
FIG. 6 is a detailed illustration of the shift/count control unit in the system of FIG. 1.

The shift/count control, depicted in FIG. 6, generates the three signals described in conjunction with FIG. 4: "count enable," "shift enable," and "shift level." Each of these will be described in turn.

The "count enable" directs the shift-register/counter 109 to count. For white run lengths other than two bit run lengths, the shift-register/counter 109 must advance one count for each bit of the run length. In the absence of "sync" or "waiting," the scanner must be encoding a line. This state is detected by gate 631 which primes gate 633. If the present bit of video is white, then a pulse will appear at the output of gate 633 during time base pulse $T_1$. The level of this pulse is then inverted by inverter 635 and enables the shift-register/counter to count. Thus, the counter will count once for each white bit of video with the exception of one and two bit run lengths. Gates 637 and 639 inhibit this pulse at the start of a white run other than one or two bits, and a two bit white run, respectively. The reason for this inhibit operation is explained in the next paragraph on the generation of the shift enable signal.

The generation of the "shift enable" signal can be divided into four categories: the initial bits of a white run, the additional bits required for long white runs, bits of a black run length, and sync bits. At the start of a white run length, three binary zeros must be shifted into the shift-register/counter 109. When the video sampler 103 senses a change of video level from black to white, the start of white signal goes to a binary zero and the output of gate 619 goes to a binary one. Time base pulses $T_6$, $T_7$, and $T_8$ from gate 623 along with the output of gate 619 prime gate 621, whose output will generate three shift enable pulses. The output of gate 617 will go to binary zero if the first bit of a line, which occurs during 0024, is white, and will also generate three shift enable pulses. These three pulses will shift three binary zeros into the shift-register/counter and thus generate the code on line 1 of FIG. 9.

For white runs equal to or greater than three bits, the shift-register/counter will advance one count on each $T_1$ during every bit period after the three binary zeroes are shifted into the register. On $T_2$, the format generator 107 will sample the code in the shift-register/counter and will advance to the next step after the appropriate count, as previously described and graphically portrayed in FIG. 9. Gates 601 through 613 and 647 sample the shift-register/counter 109 and will instruct this register to shift on format steps W1, W2, and W8 at $T_3$. Gates 507 through 515 of FIG. 5 instruct this register via signal (N) to shift on format steps W3 through W7, respectively. Format steps W3 through W7 require a two bit shift. The shift-register/counter will shift on $T_3$, as in the above case, after which the conditions necessary for a shift enable still exist and the register will again shift on $T_4$. The shift-register/counter will only shift on $T_3$ on format steps W1, W2, and W8 because the necessary conditions for a shift no longer exist when $T_4$ is present.

When a two bit white run length exists, three binary zeroes will be shifted in the shift-register/counter via gate 621, as previously mentioned. No shifting or counting will occur, and thus the proper code for a two bit run (three zeros) is generated (see FIG. 8).

When a one bit white run is present, the three zeros will be shifted in via gate 621. However, the count enable is not inhibited during the first bit as with white runs of two or more bits, and a count enable will be generated during this bit period. On the next time pulse, $T_3$, a pulse will appear at the output of gate 613, which will shift the shift-register/counter one bit and thus generate the proper code for a one bit white run (see FIG. 8).

The code for black runs appears in FIG. 8. With the exception of one and two bit run lengths, the code requires one bit for each bit of video. Gate 625 in FIG. 6 will allow one bit to be shifted into the shift-register/counter during $T_3$ for each black bit of video for run lengths other than two bits. This gate is inhibited during the first bit time of a two bit run length and enabled during the second bit time, thus shifting only one bit into the shift-register/counter. A one bit run length will cause a shift enable to be generated by fulfilling the conditions of gate 627 during $T_2$, and gate 625 during $T_3$. This will result in a two bit code. The level which is shifted into the shift-register/counter when a shift enable is present will be explained later.

Gate 629 shifts the sync word into the shift-register/counter during $T_2$ and sync. The sync signal from the format generator will be present for twenty-four bit periods, and the sync word will therefore be twenty-four bits long.

The "shift level" signal will be a binary zero except during portions of a black run or sync. This means that the occurrence of a shift enable while generating a code for a white run will shift a binary zero into the shift-register/counter. During a black run, the video sampler detects the next bit of video, and if this bit is white, this will signify the end of a black run. Gate 641 is primed by the next bit signal, $T_3$, and black, and will generate a binary one on the lead labeled shift level. Thus, all black runs will be terminated in a binary one, and the other bits will be a binary zero. Gate 643 generates a one on the shift level lead for all bits of a sync word except the first and last bits. The first bit (see FIG. 8) is always a zero and the last bit is a zero if the first bit of the line about to be encoded is white, and the last bit is a one if the first bit of this line is black. This level is generated by gate 645.

In the foregoing, there has been disclosed methods and apparatus for the encoding of binary information in a graphic comunication system. While the disclosed embodiment has been described in conjunction with a facsimile scanner, electrographic printer, and specific data set requirements, such circuitry is exemplary only as other circuits and apparatus could be utilized to perform the disclosed transmitting functions. In addition, certain binary transmission rates, number of bits in a scanned line, specific run length encoding formats, and a specific probability density function are disclosed, but it is apparent that other rates and codes could be used within the scope of the invention. Thus, while the present invention, as to its objects and advantages, as described herein, has been set forth in specific embodiments thereof, they are to be understood as illustrative only and not limiting.

What is claimed is:

1. In a binary encoder for encoding information run lengths in accordance with the statistical probability of occurrence thereof, a data sampler comprising:

first switching means for monitoring the polarity of the input binary information, second switching means coupled to said first switching means for monitoring the polarity of the next immediate bit of binary information, third switching means coupled to said second switching means for monitoring the polarity of the present bit of binary information, fourth switching means coupled to said third switching means for monitoring the polarity of the previous bit of binary information, and gating means coupled to said first, second, third, and fourth switching means to monitor the video level of said input binary information, said gating means comprising:

first means to determine the binary level of the information run lengths in said input binary information, second means to determine the length of the information run length in said input binary information, and third means to determine the end of one run length and the start of the next run length in said input binary information.

2. In a binary encoder for encoding information run lengths in accordance with the statistical probability of occurrence thereof, a data sampler comprising:

first switching means for monitoring the polarity of the input binary information, second switching means coupled to said first switching means for monitoring the polarity of the next immediate bit of binary information, third switching means coupled to said second switching means for monitoring the polarity of the present bit of binary information, fourth switching means coupled to said third switching means for monitoring the polarity of the previous bit of binary information, first gating means coupled to said first, second, and third switching means for monitoring the presence of a two-bit run length of a first polarity, second gating means coupled to said first, second, third, and fourth switching means for monitoring the start of a two-bit run length of the first polarity, third gating means coupled to said thrid and fourth switching means for monitoring the start of a run length of the first polarity, and fourth gating means coupled to said first, second, third, and fourth switching means for monitoring the start of a long run length of the first polarity.

3. The apparatus as defined in claim 2 further including fifth gating means coupled to said first, second, third, and fourth switching means for monitoring a two-bit run length of a second polarity, sixth gating means coupled to said second, third, and fourth switching means for monitoring a one-bit run length of the second polarity, and seventh gating means coupled to said third and fourth switching means for monitoring the start of a run length of the second polarity.

4. The apparatus as defined in claim 3 further including means coupled to said third switching means for monitoring the present bit of information of the second polarity, and means coupled to said second switching means for monitoring the next bit of information of the first polarity.

References Cited

UNITED STATES PATENTS

| | | | |
|---|---|---|---|
| 3,051,940 | 8/1962 | Fleckenstein | 328—37 |
| 3,151,314 | 9/1964 | Root | 328—37 |
| 3,201,512 | 8/1965 | Mason. | |
| 3,292,086 | 12/1966 | Magnuski | 325—38 |

ROBERT L. GRIFFIN, Primary Examiner

J. A. ORSINO, Jr., Assistant Examiner

U.S. Cl. X.R.

178—7.1; 325—38; 328—37; 332—11